Dec. 7, 1954 L. W. PARKER 2,696,521

AMPLITUDE MODULATION INTERCARRIER TELEVISION

Filed July 20, 1950

INVENTOR
LOUIS W. PARKER.
BY Geo. G. Hyde
ATTORNEY

United States Patent Office 2,696,521

Patented Dec. 7, 1954

2,696,521

AMPLITUDE MODULATION INTERCARRIER TELEVISION

Louis W. Parker, Little Neck, N. Y.

Application July 20, 1950, Serial No. 174,868

6 Claims. (Cl. 178—5.6)

Figure 1:
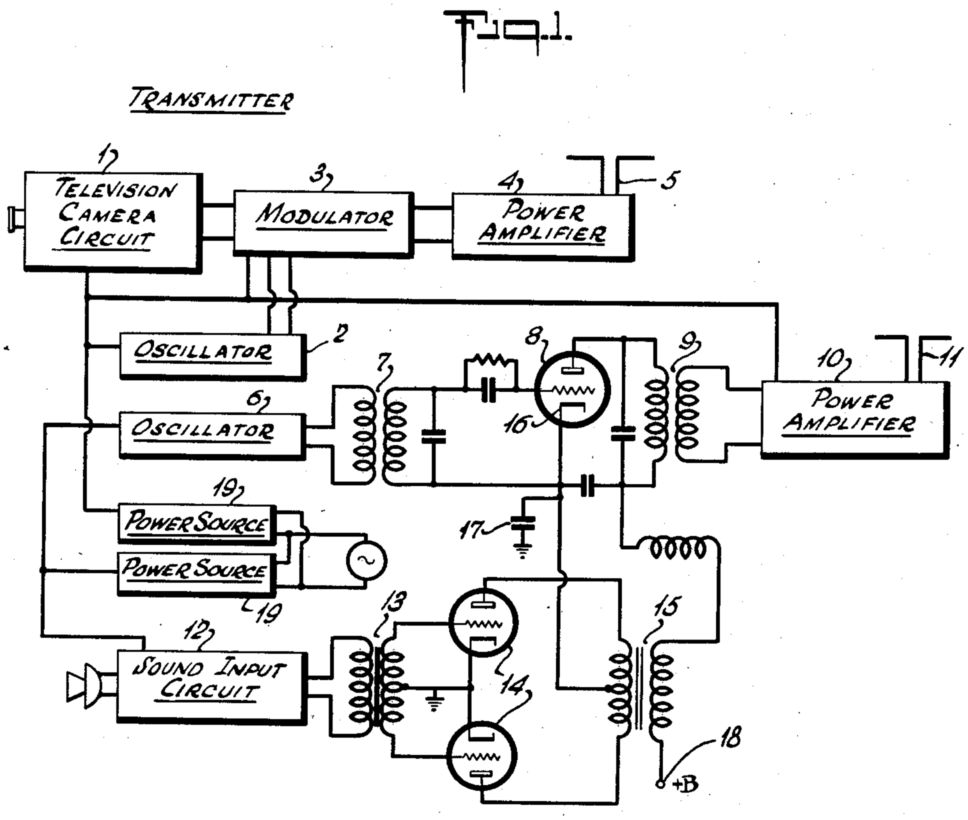

This invention relates to television systems employing the intercarrier circuit in the receiver, and is particularly directed to an arrangement which facilitates and improves the use of this circuit when the sound carrier and the picture carrier are both amplitude modulated.

The intercarrier circuit disclosed in the present inventor's United States Patent No. 2,448,908 has come into general use in the United States, where under government regulations the picture carrier is amplitude modulated and the sound carrier is frequency modulated. In this circuit, as described in said patent, the picture carrier and the sound carrier, whose frequencies are 4.5 mc. apart, are both amplified in the same circuit and pass to the same detector, whose output includes the detected picture signal wave and also a beat frequency of 4.5 mc. modulated by the sound wave.

However, while said patent illustrates the invention by its use in the United States system, it is also applicable to systems such as that now used in England, where both carriers are amplitude modulated. The patent explains in detail that by attenuating the sound carrier relative to the picture carrier before heterodyning, the effect of the amplitude modulation of the picture carrier on the beat carrier is very much reduced, so that when the amplitude of the sound carrier at the detector is sufficiently low, as for instance 5% of the picture carrier, the effect of picture carrier modulation on the sound is so slight that in practice it can be ignored.

This principle is of course equally effective when the intercarrier circuit is used with a system in which both the picture carrier and the sound carrier are amplitude modulated; but such use introduces several new problems. In the latter system the amplitude of the sound carrier varies because of the modulation, no limiter or balanced discriminator can be used, and in order to reduce the interference from picture modulation to a negligible value merely by maintaining the proper amplitude ratio, the sound carrier wave would have to be so attenuated that its amplitude would be a smaller fraction than one-twentieth of the amplitude of the picture carrier. This would require a degree of attenuation that would produce problems in effectively handling the relatively weak sound carrier, and the risk that other interference might make the sound unintelligible.

A purpose of this invention is to provide a television system employing the intercarrier circuit which will reduce audible interference caused by the picture carrier modulation to a negligible value without excessive attenuation of the amplitude modulated sound carrier. This is in general accomplished by using the controlled carrier method of modulation of the sound carrier. In this method the amplitude of the sound carrier itself is varied at a subaudible rate as the amplitude of the modulation wave changes, so that with low sound modulation the carrier amplitude is low, while with high modulation it is relatively high. The use of this modulation system takes advantage of the fact that any interference noise produced by the picture signals would be most noticeable when the sound volume is low, and would not be great enough to be of importance when the sound volume is substantial. Since the controlled carrier modulation system reduces the carrier amplitude when the sound modulation is low or absent, the circuits can be designed so that with said low modulation the ratio of the amplitude of the sound carrier to the minimum amplitude of the picture carrier is low enough to eliminate material interference from the picture signals, while with substantial sound modulation, although said ratio will be decreased and any such interference will tend to increase, the higher sound volume will make such interference imperceptible or in any event negligible. This arrangement therefore permits the use of a sound carrier that can be readily amplified and detected without introducing objectionable interference from picture signals.

Television receivers are usually provided with automatic volume control, including a control circuit coupled to an amplification stage for the sound carrier, from which it derives a voltage that is applied to an earlier stage so as to maintain uniform sound volume in well-known manner. However, when the controlled carrier system is used for sound transmission this arrangement causes trouble; for instance, it may cause compression of the sound volume. Another feature of the invention is the provision of a novel automatic volume control that is effective with the controlled carrier system. This is in general accomplished by designing and arranging the volume control input to pick up the regulating energy from the picture carrier instead of the sound carrier in the common amplifier that is characteristic of the intercarrier circuit.

Figure 2:
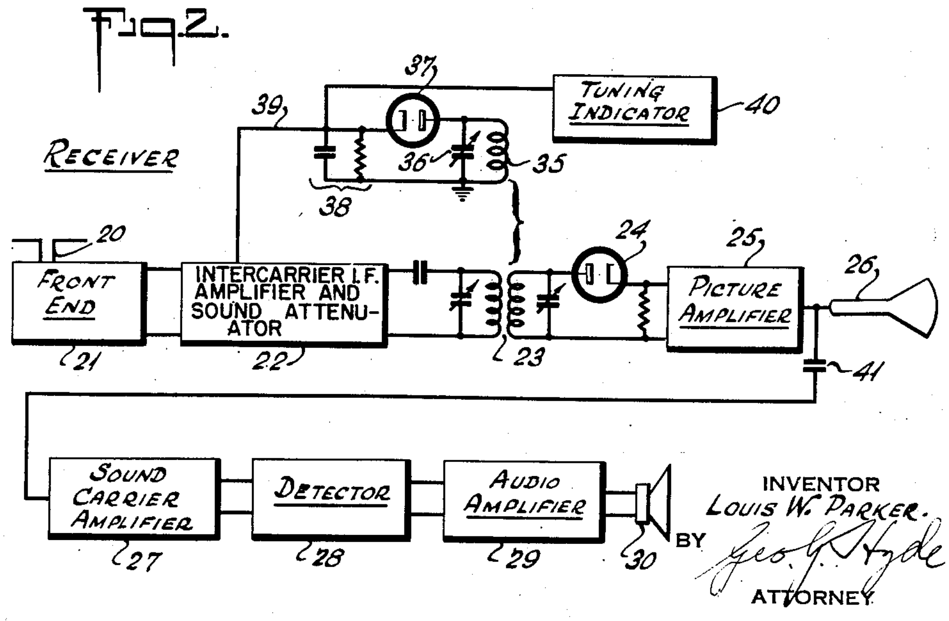

Other objects and advantages will appear from the following description, considered in conjunction with the accompanying drawing, in which:

Fig. 1 is a diagram of a television transmitter employing a controlled carrier generating circuit, and Fig. 2 is a diagram of a television receiver for waves from said transmitter, employing the intercarrier circuit and provided with automatic volume control.

The television transmitter shown in Fig. 1 is in general of conventional type, and the sections thereof whose construction and arrangement are standard are therefore indicated by blocks, including the camera circuit 1, the picture carrier generating oscillator 2, modulator 3, power amplifier 4, and picture signal carrier radiating antenna 5. The sound carrier generating oscillator 6 is connected through transformer 7 to triode 8, operated as a Class C amplifier, the tube output passing through transformer 9 to power amplifier 10 and sound carrier radiating antenna 11.

The sound input circuit 12 is coupled through transformer 13 to push-pull amplifier tubes 14, transformer 15 and the anode circuit of tube 8, tubes 14 being operated as class B amplifiers. The anodes of tubes 14 are connected through the primary of transformer 15 to the circuit of cathode 16 of tube 8 at a point between said cathode and ground 17, as far as direct current and very low frequency currents are concerned. The anode of the tube 8 is connected through the primary of transformer 9 and the secondary of transformer 15 to anode potential source 18. The transmitter circuits are connected to a common power source 19.

With this arrangement, when there is little or no modulation from sound input circuit 12 the tubes 14 will consume a large portion of the anode voltage from source 18. As the modulating wave from circuit 12 increases in amplitude, producing higher current and lower voltage between the anodes and cathodes of tubes 14, a larger proportion of the voltage from source 18 will be applied between the anode and cathode of tube 8, with a corresponding increase in sound carrier amplitude, which therefore will vary in accordance with variations in the average amplitude of the sound modulation. It will be understood that the above arrangement for producing controlled carrier modulation is illustrative, as other ararngements for this purpose are known. Likewise, only the basic circuit has been shown, omitting known refinements, such as the use of time delay arrangements to prevent distortion by sudden large increase in amplitude.

The television receiver illustrated in Fig. 2 is likewise largely of standard type, including the superheterodyne intercarrier circuit disclosed in the abovementioned patent, and well-known sections of the receiver are therefore indicated by blocks. The receiving antenna 20 feeds front end 21, whose output passes through intermediate frequency amplifier 22 terminating in transformer 23 connected through picture detector 24 to picture amplifier 25, whose output goes to picture tube 26. The beat frequency carrying the sound modulation is taken from the output of amplifier 25 in known manner, as for example through a very small condenser 41 to the sound carrier amplifiers 27 connected to detector 28, whose output passes through audio amplifier 29 to loud speaker 30.

An automatic volume control circuit is provided in the receiver; but as already pointed out, it cannot be operated by variations in sound carrier amplitude in the usual manner. This difficulty is overcome by utilizing the fact that in the intercarrier circuit the sound and picture carriers pass through the same amplifying circuit. The input coil 35 of the volume control circuit is coupled to transformer 23 and tuned by variable condenser 36 to the frequency of the picture carrier in said transformer. Coil 35 is connected to rectifier 37, filter 38 and lead 39, which applies the volume controlling voltage to the amplifier 22 in well-known manner. A suitable tuning indicator 40 may also be connected to lead 39, and may be of any standard type, such as the well-known tuning eye tube in its usual circuit.

The operation of the automatic volume control circuit is apparent. It will respond to undesired variations in amplitude, such as the usual fading, which of course affects both the sound carrier and the picture carrier. By taking the feed-back energy from the picture carrier, the volume control circuit reflects and counterbalances accurately the undesired variations, and applies the necessary corrections to the sound carrier also by taking advantage of the fact that both carriers pass through the same amplifiers in the intercarrier system.

While a preferred embodiment has been described, it will be apparent that the showing herein may be varied without departing from the invention as defined in the claims.

I claim:

1. A television system comprising picture and sound transmitters with means for generating an amplitude modulated picture signal carrier, and means for generating an amplitude modulated sound carrier, said sound transmitter including means to amplitude modulate said sound carrier with audio frequency signals and to vary the amplitude of said sound carrier at a subaudible rate in such manner that low amplitude audio signals modulate a low amplitude carrier and high amplitude audio signals modulate a high amplitude carrier; and a television receiver employing the intercarrier system of sound reception and having all of the following: a common amplifier for the picture and sound signals before demodulation, means fed by said common amplifier for deriving a new carrier frequency for the sound signals which is the result of the heterodyning of the carriers of said picture and sound signals, means for demodulating said new carrier and reproducing said sound signals, and means for reproducing the picture signals.

2. A system as claimed in claim 1 in which said common amplifier includes means for attenuating the sound signal carrier relative to the picture signal carrier.

3. A system as claimed in claim 1 in which an automatic volume control circuit is used in the receiver, said automatic volume control circuit deriving control potential from the common amplifier for the picture and sound carriers and including a tuned circuit, tuned to the picture carrier frequency, a rectifier and filter circuit connected to said tuned circuit and arranged to generate a substantially pure direct potential proportional to the peaks of the modulated picture signal, and means utilizing said potential to control the gain and stabilize the output of that amplifier.

4. A system as claimed in claim 1 in which the amplifier includes attenuating means for attenuating the sound signal carrier relative to the picture signal carrier and to a value not substantially greater than five percent of the value of the modulated picture signal carrier when the sound signal carrier is at its highest value.

5. A system for transmitting and receiving two amplitude modulated signals comprising transmitting means for transmitting first and second modulated signals on adjacent frequencies which are spaced apart more than the width of a side band of the first signal, said transmitting means including means for further varying the amplitude of the carrier of the second signal with variations in the amplitude of an input signal so that a low amplitude input modulates a low amplitude carrier and a high amplitude input modulates a high amplitude carrier, and receiving means including all of the following: means for intercepting both of said carriers, jointly amplifying them, and deriving from the amplified signals a carrier equal to the difference in the carrier frequencies of the signals, means for deriving from the last-named carrier a signal representative of the second signal produced at the transmitter, and means responsive to the output of the receiving means for deriving modulations representative of those on the first signal at the transmitter.

6. A system for transmitting and receiving two amplitude modulated signals comprising transmitting means for transmitting first and second modulated signals on adjacent frequencies which are spaced apart more than the width of a side band of the first signal, said transmitting means including an input and means for modulating the second carrier according to energization of said input to produce variations in the amplitude of the modulated carrier according to variations in said energization whereby a low amplitude input modulates a low amplitude carrier and a high amplitude input modulates a high amplitude carrier; and receiving means including all of the following parts: intercarrier receiving and amplifying means for jointly receiving both of said signals, amplifying the first one far more than the second one, and deriving a carrier of a frequency equal to the difference in the carriers of said signals and modulated according to the modulations of said second signal, and means for deriving from said intercarrier receiving and amplifying means a signal representative of the modulations on said first signal.

References Cited in the file of this patent

UNITED STATES PATENTS

| Number | Name | Date |
|---|---|---|
| 2,521,052 | Edwards | Sept. 5, 1950 |

FOREIGN PATENTS

| Number | Country | Date |
|---|---|---|
| 435,565 | Great Britain | Sept. 24, 1935 |
| 601,227 | Great Britain | Apr. 30, 1948 |